(12) United States Patent
Dalmazzone et al.

(10) Patent No.: US 7,247,604 B2
(45) Date of Patent: Jul. 24, 2007

(54) OIL-BASED DRILLING FLUID COMPRISING A TEMPERATURE-STABLE AND NON-POLLUTING EMULSIFYING SYSTEM

(75) Inventors: Christine Dalmazzone, Versailles (FR); Annie Audibert-Hayet, Croissy sur Seine (FR); Bruno Langlois, Sainte Genevieve des Bois (FR); Sylvie Touzet, Antony (FR)

(73) Assignees: Institut Francais du Petrole, Rueil Malmaison Cedex (FR); Rhodia Chimie, Aubervilliers Cedex (FR)

( * ) Notice: Subject to any disclaimer, the term of this patent is extended or adjusted under 35 U.S.C. 154(b) by 108 days.

(21) Appl. No.: 10/297,478

(22) PCT Filed: Jun. 5, 2001

(86) PCT No.: PCT/FR01/01722

§ 371 (c)(1), (2), (4) Date: Jul. 21, 2003

(87) PCT Pub. No.: WO01/94495

PCT Pub. Date: Dec. 13, 2001

(65) Prior Publication Data

US 2004/0014609 A1 Jan. 22, 2004

(30) Foreign Application Priority Data

Jun. 6, 2000 (FR) .................................. 00 07198

(51) Int. Cl.
C09K 8/36 (2006.01)

(52) U.S. Cl. ..................... 507/131; 507/138; 507/925

(58) Field of Classification Search ..................... None
See application file for complete search history.

(56) References Cited

U.S. PATENT DOCUMENTS

| | | | | |
|---|---|---|---|---|
| 4,017,405 A * | 4/1977 | Holm | .......................... | 507/254 |
| 4,268,401 A | 5/1981 | Meschkat et al. | | |
| 4,374,737 A * | 2/1983 | Larson et al. | ................ | 507/130 |
| 4,582,543 A * | 4/1986 | Bretz | .......................... | 148/250 |
| 4,609,415 A * | 9/1986 | Cartwright | ...................... | 149/2 |
| 4,672,090 A * | 6/1987 | Chan | .......................... | 524/728 |
| 4,732,576 A * | 3/1988 | Friedrich et al. | ............. | 44/301 |
| 4,941,983 A * | 7/1990 | Coates et al. | ................ | 507/107 |
| 4,964,999 A * | 10/1990 | Russo | ........................ | 507/211 |
| 5,283,235 A | 2/1994 | Bush et al. | | |
| 5,330,662 A | 7/1994 | Jahnke et al. | | |
| 5,593,954 A * | 1/1997 | Malchow, Jr. | .............. | 507/135 |
| 5,620,946 A * | 4/1997 | Jahnke et al. | ............... | 507/131 |
| 5,723,423 A * | 3/1998 | Van Slyke | .................. | 510/188 |
| 5,888,944 A * | 3/1999 | Patel | .......................... | 166/300 |
| 6,284,714 B1* | 9/2001 | Bland et al. | ................. | 507/100 |
| 6,689,908 B1* | 2/2004 | Le Helloco et al. | ........ | 564/153 |

FOREIGN PATENT DOCUMENTS

| | | | |
|---|---|---|---|
| CA | 1053111 A * | 4/1979 | |
| EP | 0561607 | 9/1993 | |
| EP | 0561608 | 9/1993 | |
| FR | 2040092 | 1/1971 | |
| FR | 2316326 | 1/1977 | |
| FR | 2798387 | 3/2001 | |
| GB | 1264102 A * | 9/1977 | |
| JP | 60-81117 A * | 5/1985 | |
| WO | WO 01/18092 A1 | 3/2001 | |
| WO | WO 0118092 A1 * | 3/2001 | |

OTHER PUBLICATIONS

Grand LaRousse Encyclopedique, 2006, definition of densite, two pages.*
Chemical abstracts registry No. 80893-63-6 for Witcamide 511, 2006, one page.*
Chemical abstracts registry No. 112-80-1 for oleic acid, 2006, two pages.*
Chemical abstracts registry No. 60-33-3 for linolecic acid, 2006, one page.*
Chemical abstracts registry No. 57-10-3 for palmitic acid, 2006, one page.*
English translation of WO/18092.

* cited by examiner

Primary Examiner—Robert Sellers
(74) Attorney, Agent, or Firm—Millen, White, Zelano & Branigan, P.C.

(57) ABSTRACT

A temperature-stable, non eco-toxic oil-base well fluid that is particularly suitable for high pressure/high temperature drilling comprises an emulsification system comprising at least one superamide that may or may not be polyalkoxylated, optionally associated with a non-ionic co-surfactant. The oil-base well fluid comprising such a system can be used at temperatures of up to about 200° C. due to the production of highly temperature-stable reverse emulsions.

10 Claims, 2 Drawing Sheets

Figure 1:
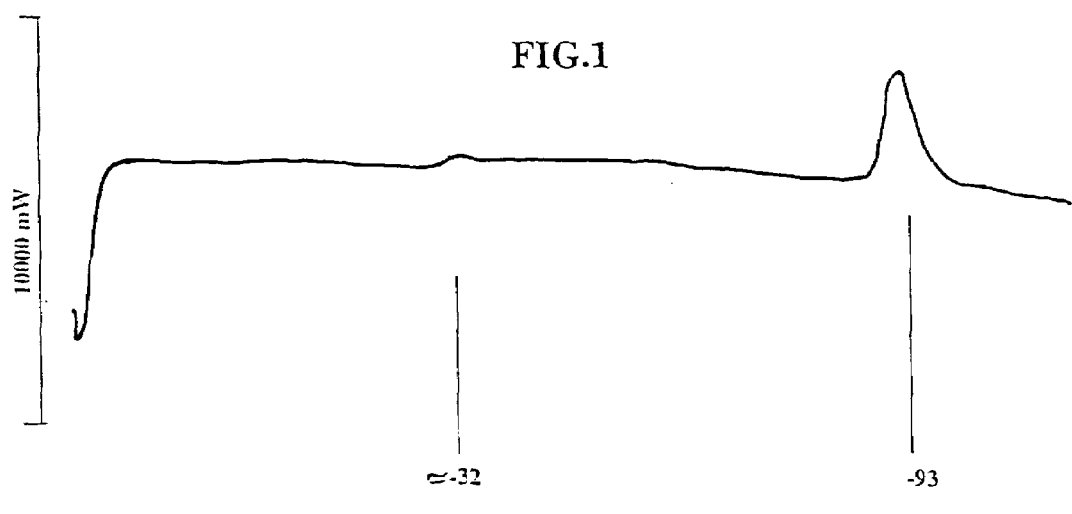
Figure 2:
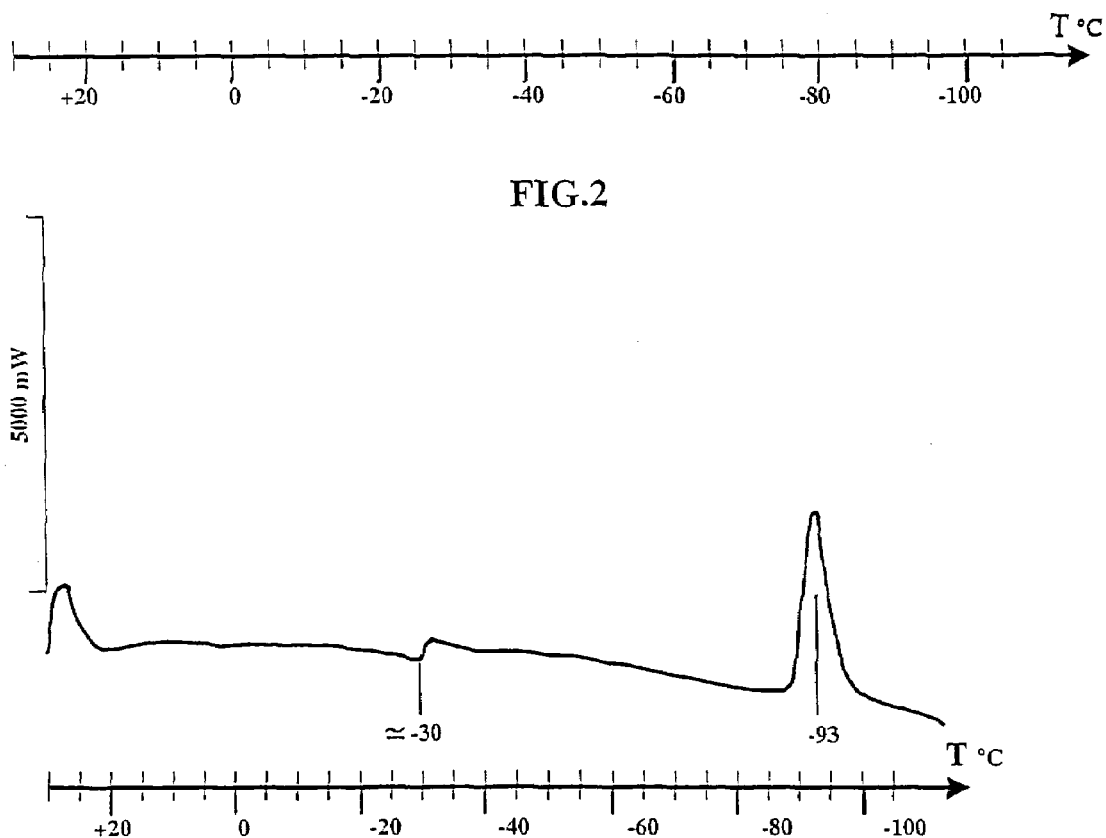

OIL-BASED DRILLING FLUID COMPRISING A TEMPERATURE-STABLE AND NON-POLLUTING EMULSIFYING SYSTEM

The present invention relates to the use of a non-toxic emulsification system that can stabilise a water-in-oil emulsion even at high temperatures for a formulation for oil-based well fluids for use under HP/HT (high pressure/high temperature) drilling conditions, i.e., up to about 200° C.

When drilling a well, more particularly an oil well, a well fluid has to be used, in particular a drilling fluid or drilling mud, to transport the debris generated by drilling to the surface. The well fluid must also cool and lubricate the tool, maintain the well walls, exert a sufficient counter-pressure and, finally, prevent damage to the formation.

Two types of well fluids are mainly used: water-base fluids or water-base mud, and oil-base fluids or oil-base mud. Water-base muds are much cheaper and more ecologically acceptable than oil-base muds, but the latter have clear operational advantages, in particular when drilling very deep wells (HP/HT): good friction reduction, the fluid is inert to the formation, in particular clay, damage to the production zone is slight, etc.

Typically, oil-base muds are water-in-oil emulsions containing 5% to 40% by volume of a dispersed aqueous saline phase. Such reverse emulsions principally comprise three types of compounds:
- emulsifiers to stabilise the emulsion;
- organophilic clays to control the rheological properties, more particular thixotropy;
- weighting materials such as barium sulphate (barytine) to adjust the density of the fluid.

Two major problems are encountered regarding the use of oil-base muds for drilling very deep wells:
- a problem with the stability of the emulsions with temperature: the emulsifying agents stabilising the emulsions must maintain water droplets in an emulsion up to temperatures of close to 200° C. If the emulsion separates by coalescence of the water droplets, the fluid loses its rheological properties and, in particular, risks causing severe damage to the formation;
- an environmental problem; the emulsification agents must not only be effective, but also as non-toxic as possible.

In general, on passing from traditional oil-based systems that are rich in diesel type aromatics to oil-based formulations that are less noxious to the environment, the muds become less stable to temperature. That may be due to the stability to temperature of the oil used, such as plant esters, or to the emulsification system, this does not stabilise the emulsion at higher temperatures. The limit is about 150° C., which often causes problems with fluid loss control at high temperatures. This loss of properties is the basis of problems with damage to the reservoirs (water infiltration) and major losses of productivity in wells drilled with such fluids.

The present invention proposes the use in well fluids of an emulsification system that ensures the stability of the mud up to about 200° C. and, further, has a reduced toxicity.

The principal emulsifying agent consists of at least one alkoxylated, polyalkoxylated or non-alkoxylated superamide as described in French patent application FR-A-2 798 387 in the name of RHODIA CHIME published on 16 Mar. 2001.

Figure 3:
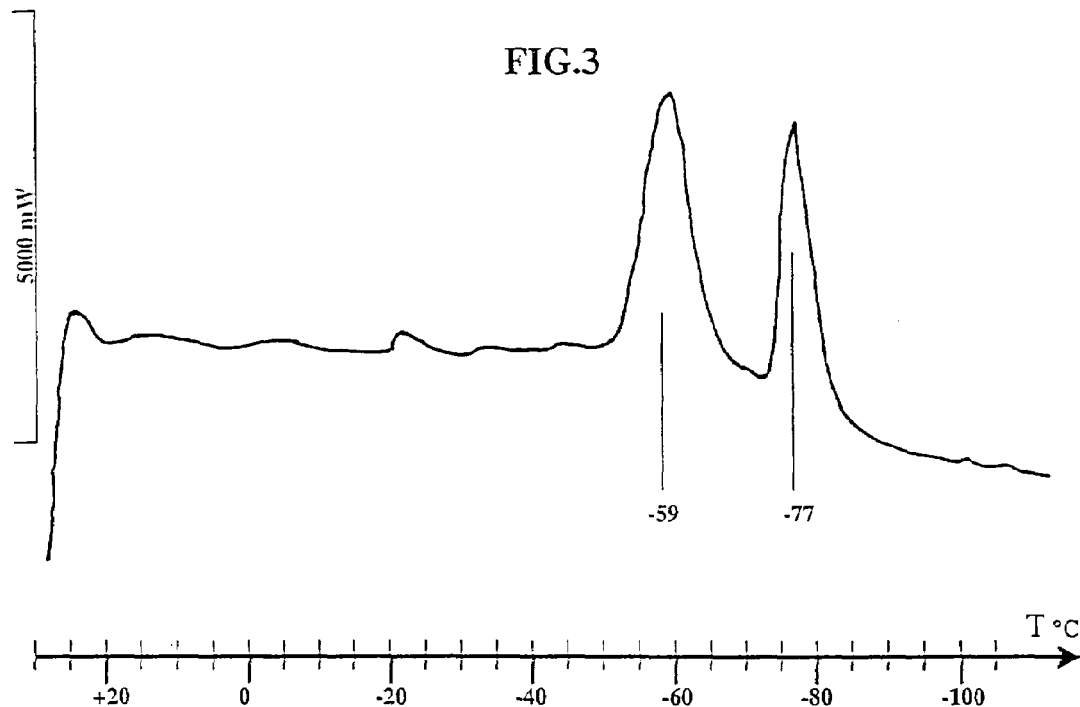
Figure 4:
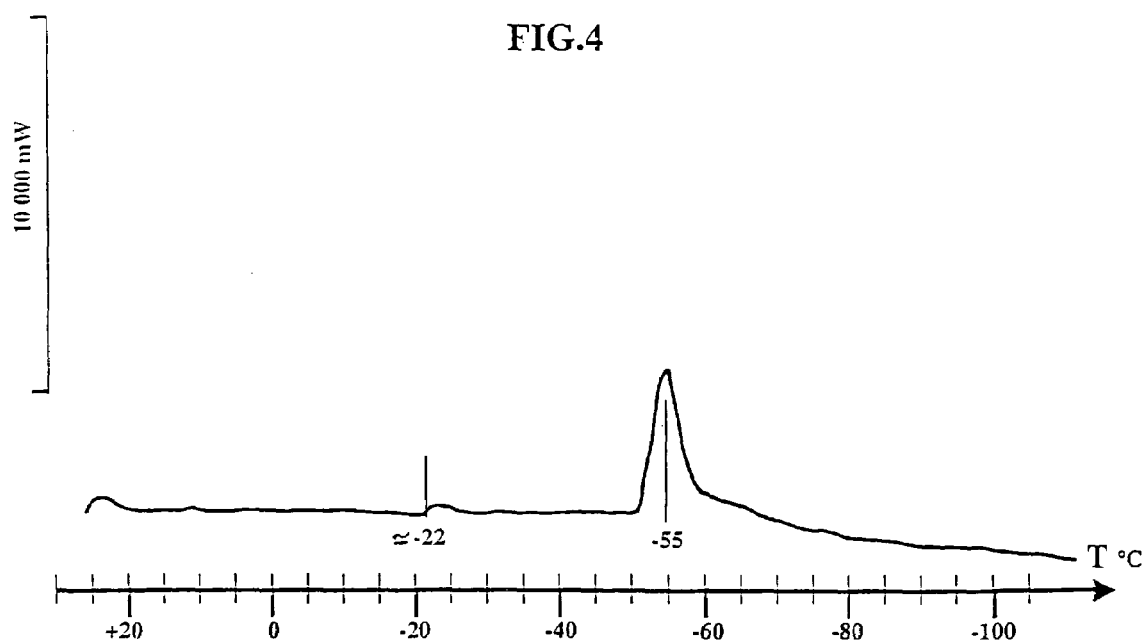

FIGS. 1 to 4 show DSC profiles for emulsifications systems TA4 and TA1 before aging (FIGS. 1 and 2) and after aging for 16 hours at 180° C. (FIGS. 3 and 4). Emulsification system TA4 representative of the disclosure comprises a mixture of 20% by weight of Superamide SA3 derived from one mole of rapeseed oil methyl ester and one mole of monoethanolamine, with 80% by weight of fatty acid Resinoline BD2®. Emulsification system TA1 is a comparison containing 88% by weight of lnterdrill Emul HT® and 12% by weight of Interdrill LORM®.

The term "superamides" generally means the family of alkanolamides obtained by transamidification of a fatty acid ester and a mono-alcohol or an oil of a plant or animal origin (triglyceride). Alkanolamides exist that are obtained by amidification of a fatty acid. However, they are obtained in the form of a mixture comprising the amide, amine, fatty acid and water. Typically, the concentration of amide is equal to 60-65% by weight. In contrast, in the case of superamides, the final mixture generally contains more than 90% by weight of amide, which constitutes a clear advantage. During synthesis of the superamide, the alcohol from the fatty acid ester employed is distilled off during the reaction, allowing the reaction to go to completion. The superamides produced in the process described in the patent application cited above contains a minimum of residual amines and are thus less toxic than equivalent amides produced using conventional processes that are known to the skilled person.

The invention proposes an oil-based well fluid that is temperature-stable, non-toxic to the environment and particularly suitable for high pressure/high temperature drilling, comprising an aqueous phase dispersed in a non-miscible continuous phase and characterized in that it comprises an emulsification system comprising at least one alkoxylated, polyalkoxylated or non-alkoxylated superamide with one of the following general formulae:

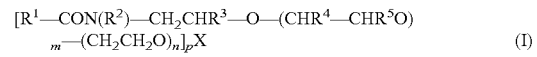

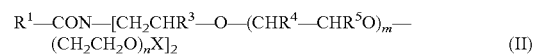

where
$R^1$ represents a linear or branched, saturated or unsaturated $C_7$-$C_{30}$, preferably $C_{10}$-$C_{22}$ hydrocarbon radical, in particular an aliphatic radical, optionally carrying at least one hydroxyl group;
$R^2$ represents a hydrogen atom or a $C_1$-$C_4$ hydrocarbon radical;
$R^3$ represents a hydrogen atom or a $C_1$-$C_4$ hydrocarbon radical;
$R^4$ and $R^5$, which may be identical or different, represent a hydrogen atom or an alkyl radical containing 1 or 2 carbon atoms, provided that at most one of said two radicals is a hydrogen atom;
X represents a hydrogen atom, a $C_1$-$C_6$ hydrocarbon radical, a phosphate, carboxylate, sulphate or sulphonate group;
m is an average number in the range 0 (included) to 20;
n is an average number in the range 0 (included) to 50; and
p is 1 or 2 depending on the nature of X.

The case where n=0 and m=0 is the preferred case of the invention. The corresponding superamides are not polyalkoxylated superamides.

More particularly, radical $R^1$ is a linear or branched, saturated or unsaturated $C_{10}$-$C_{22}$ hydrocarbon radical derived from a saturated or unsaturated fatty acid that may carry at least one hydroxylated group. Preferably, said radical contains at least one ethylenically unsaturated bond.

Examples of $C_{10}$-$C_{22}$ saturated fatty acids that can be cited are lauric acid, capric acid, decanoic acid, stearic acid, isostearic acid, gadoleic acid and myristic acid. Non limiting examples of $C_{10}$-$C_{22}$ fatty acids containing at least one ethylenically unsaturated bond that can be cited are linderic acid, myristoleic acid, palmitoleic acid, oleic acid, petroselenic acid, doeglic acid, erucic acid, linoleic acid, linolenic acid, isanic acid, stearodonic acid, arachidonic acid, chypanodonic acid and ricinoleic acid. Of the above acids, radical $R^1$ more particularly derives from fatty acids selected from palmitoleic acid, oleic acid, petrolselenic acid, erucic acid, linoleic acid, linolenic acid and ricinoleic acid.

Radicals $R^2$ and $R^3$, which may or may not be identical, each represent a hydrogen atom or a $C_1$-$C_4$ hydrocarbon radical; more particularly, it is saturated. Preferably, radicals $R^2$ and $R^3$ each represent a hydrogen atom or a methyl, ethyl, propyl, isopropyl, butyl or isobutyl radical.

Radicals $R^4$ and $R^5$ are preferably each selected from hydrogen or the methyl radical, provided that one but not both represent a hydrogen atom at the same time. In this preferred embodiment, the corresponding moiety derives from propylene oxide.

As already indicated above, m, which represents an average number, is in the range 0 (included) to 20. Similarly, n, which represents an average number, is in the range 0 (included) to 50.

The compounds of the present invention are preferably in the non-ionic form. Radical X then represents a hydrogen atom or a $C_1$-$C_6$ hydrocarbon radical. In such a case, the value of p is 1.

As indicated above, the superamides employed in the invention are obtained by transamidification of an ester of a fatty acid and a mono-alcohol or an oil of plant or animal origin (triglyceride), using an amine, in particular an alkanolamine such as monoethanolamine or diethanolamine.

Examples of oils of plant origin that can be mentioned include rapeseed oil, sunflower oil, peanut oil, olive oil, walnut oil, corn oil, soya bean oil, linseed oil, hempseed oil, grapeseed oil, coprah oil, palm oil, cottonseed oil, babassu oil, jojoba oil, sesame seed oil, castor oil and coriander oil. Preferably, rapeseed oil is used.

Examples of oils of animal origin that can be cited include sperm whale oil, dolphin oil, whale oil, seal oil, sardine oil, herring oil, shark oil, cod liver, calfsfoot oil and beef, pork, horse and sheep fats (suet).

Finally, the superamides can be obtained from products (esters of fatty acids and mono-alcohols) resulting from alcoholysis reactions, more precisely methanolysis, of the above oils. Such products are then alkyl esters, more precisely methyl esters, formed with the mixtures of fatty acids contained in such oils.

When preparing the oil-based well fluids of the invention, the continuous phase or oil phase can contain any type of oil base routinely used to form this type of fluid: examples are gas oil, crude oil, gasoline, kerosine or, as now recommended for environmental protection reasons, low toxicity hydrocarbon cuts such as olefins (Ultidrill® from DOWELL SCHLUMBERGER) or n-alkane cuts (XP07® from BAROID or EDC95® from BHI) the main characteristic of which is that it does not contain any, or only a few aromatic hydrocarbons, which are principally responsible for the high toxicity of conventional oil bases.

The concentration of base oil can be in the range 60% to 95%, preferably in the range 70% to 90% by volume.

The quantity of water used to produce such fluids is in the range 5% to 40%, preferably in the range 10% to 30% by volume of fluid. This aqueous phase can be fresh water or salt water, either seawater or brine. The presence of high concentrations of NaCl, $CaCl_2$, $CaCO_3$ or $CaSO_4$ has no negative effect on the stability of the emulsion produced, the emulsification agent being non-ionic and thus only slightly sensitive to the presence of salts.

The superamides in the well fluids of the invention can be used alone or as a mixture.

The principal emulsification agent as defined above is preferably used with a co-surfactant, preferably anionic such as a fatty acid, a dibasic carboxylic acid or a carboxylate. Examples that can be cited are tall oil fatty acids.

The exact composition of the well fluid depends on the particular application to which that fluid is to be applied. However, in the majority of cases, emulsification agent concentrations of 10% to 30% by weight with respect to the aqueous phase will be sufficient to obtain satisfactory results. The co-surfactant can, for example, represent about 40% to 90% by weight of the emulsification system.

The fluid can contain 5% to 25% by weight of lime, 5% to 15% by weight of organophilic treated clay (for example bentonite) and at least one weighting material such as barium sulphate (barytine), in a quantity sufficient to produce a density of about 2.4, based on the ratio of the mass of the weighting material to the mass of water occupying the same volume at 4° C.

The prepared well fluid can be used for drilling, completion or workover of a well by circulating a quantity sufficient to obtain the desired results.

The stability of the emulsions and muds of the invention can be tested in different manners: stability tests also termed bottle tests carried out on samples of primary emulsions at different temperatures; API electrical stability tests carried out on complete muds before and after aging; and HP/HT filter tests before and after aging. Calorimetric measurements carried out using DSC before and after aging complete muds can also quantify the influence of aging at temperature on the size of the droplets in the emulsion.

The following examples illustrate the invention without in any way limiting its scope. Unless indicated otherwise, the percentages are given by weight.

The following emulsification systems were used in the examples:

TA1: commercially available system: Interdrill Emul HT® and Interdrill LORM® (88%-12% by weight) used by way of comparison;

TA2 (in accordance with the invention): mixture of 35% by weight of SA1 superamide, the rest being fatty acid. Superamide SA1 results from reacting one mole of rapeseed oil with 2.5 moles of diethanolamine. The fatty acid was a tall oil fatty acid sold under the trade name Résinoline BD2® by DRT-GRANEL. It contains 48 by weight of oleic acid and 30 by weight of linoleic acid with a maximum palmitic and stearic acid content that is of equal weight;

TA3 (in accordance with the invention): mixture of 50% by weight of SA2 superamide and 50% by weight of fatty acid (Résinoline BD2®). Superamide SA2 results from reacting one mole of rapeseed oil methyl ester with 1 mole of monoethanolamine;

TA4 (in accordance with the invention): mixture of 20% by weight of SA3 superamide and 80% by weight of fatty acid (Résinoline BD2®). Superamide SA3 results from reacting one mole of rapeseed oil methyl ester with a high erucic acid content ($C_{22}$) with 1 mole of monoethanolamine;

TA5 (in accordance with the invention): mixture of 50% by weight of SA4 superamide and 50% by weight of fatty acid (Résinoline BD2®). Superamide SA4 results from reacting one mole of rapeseed oil methyl ester with a high erucic acid content with 1 mole of monoethanolamine followed by reacting the amide formed (SA3) with 1 mole of propylene oxide;

TA6 (in accordance with the invention): mixture of 20% by weight of SA3 superamide and 80% by weight of fatty acid (Résinoline BD2®). Superamide SA3 results from reacting one mole of rapeseed oil methyl ester with a high erucic acid content with 1 mole of monoethanolamine. 25% of glycerol was added to this mixture, optimised for a large quantity of solids in the formulations.

EXAMPLE 1

Bottle Tests Carried Out on Primary Emulsions

The emulsification agents were firstly evaluated using simplified systems or primary emulsions compared with a commercially available emulsification system (Interdrill Emul HT® and Interdrill LORM® from DOWELL-SCHLUMBERGER).

Formulation:
Base oil: Ultidrill® mineral oil;
Brine: water with 20% by weight of $CaCl_2$;
Emulsification systems used: TA1, TA2, TA3, TA5.

The total quantity of emulsification agents was varied from 3% to 15% by weight with respect to the volume of brine.

The emulsification agents were dissolved in 56 ml of oil and mixed for 2 min at 7200 rpm using a Silverson mixer. The brine (14 ml) and lime (1.4 g of $Ca(OH)_2$) were added to the mixture and stirring was continued for 15 min at 7200 rpm. The mixture, 70 ml, was then poured into a 100 ml graduated cylinder. The stability of the emulsion was observed after 2 hours and after 24 hours.

The results, expressed as a percentage of the emulsified phase with respect to the initial volume, are shown in the table below.

TABLE 1

| | Emulsification agent | | | | | | | |
|---|---|---|---|---|---|---|---|---|
| | % emulsion after 2 hours | | | | % emulsion after 24 hours | | | |
| | TA1 | TA2 | TA3 | TA5 | TA1 | TA2 | TA3 | TA5 |
| 3% by weight | 39 | 65 | 99 | 67 | 31 | 49 | 86 | 50 |
| 7.5% by weight | 48 | 97 | 99 | 96.4 | 33 | 66 | 94 | 52.9 |
| 15% by weight | 86 | 99 | 100 | 97.2 | 40 | 97 | 99 | 62 |

It can be seen that the emulsification systems of the invention can produce a much higher primary emulsion stability than the comparative system. The formulation comprising the emulsification system TA3 of the invention produced the best results.

EXAMPLE 2

Bottle Tests Carried Out on Primary Emulsions

The effect of aging emulsions at atmospheric pressure at temperatures of 20° C. to 70° C. was also observed for several emulsification systems.

Formulation:
Base oil: Ultidrill® mineral oil (H1) or EDC95® (H2);
Brine: water with 20% by weight of $CaCl_2$;
Emulsification systems used: TA1, TA3 and TA4.
The results are shown in the table below.

TABLE 2

| Oil | H1 | | | H2 | | |
|---|---|---|---|---|---|---|
| Emulsification system | TA1 | TA3 | TA4 | TA1 | TA3 | TA4 |
| Stability at 20° C. | <30' | >96 h | >96 h | <30' | >96 h | >96 h |
| Stability at 50° C. | <30' | >1 h | >18 h | <30' | >1 h | >23 h |
| Stability at 70° C. | <30' | <30' | >30' | <30' | <1 h | >3 h |

Again, it can be seen that the emulsification systems of the invention produced much higher temperature stability in the emulsion.

EXAMPLE 3

Stability of Complete Muds

Different emulsification systems were compared in a complete formulation. The different components were mixed using a Hamilton Beach blender and the emulsion was formed using a Silverson mixer provided with an emulsification head.

288 ml of base oil was poured into the goblet of a Hamilton Beach blender and 14 g of the emulsification system, 3 g of fluid loss control agent (Versatrol or Truflo 100) and 12.5 g of lime $Ca(OH)_2$ were added, mixing at low speed for 5 min. 7 g of organophilic treated clay ("bentone 38") was then added and mixing was continued for 5 min at low speed. 74 ml of brine comprising 20 g of $CaCl_2$ per 100 g of distilled water was slowly added and stirring was maintained for 10 min (low speed). 452 g of barytine (weighting material) was then slowly added and the mixture was stirred at medium speed for 20 min. The final step in producing the mud was made with a Silverson L4RT apparatus with standard equipment provided with an emulsification head. The mixture was stirred at 6600 rpm for 10 minutes.

The well fluid was then evaluated before and after aging for 16 hours at 180° C. using API rheology tests and electrical stability tests (API standard 13B-2) and static HP/HT filtration. The static filtration test was carried out with a pressure difference of 35 bars and at a temperature of 180° C.

One important determination was that of the quantity and quality of the filtrate before and after aging the mud. The recovered filtrate must be free of water. If the presence of free water or emulsion is detected, this means that the emulsion has broken during the filtration process.

For the muds considered in a first series of determinations, the base oil was Ultidrill® (H1) mineral oil and the emulsification systems used were TA1, TA3, TA4 and TA5.

The results are shown in the table below.

TABLE 3

| | Emulsification agent | | | | | | |
|---|---|---|---|---|---|---|---|
| | Before aging | | | | After aging 16 hours at 180° C. | | |
| | TA1 | TA3 | TA4 | TA5 | TA1 | TA3 | TA4 |
| AV (cP) | 35 | 34 | 44 | 53 | 45 | 52 | 86 |
| PV (cP) | 24 | 23 | 30 | 36 | 37 | 30 | 55 |
| YP (lb/100 ft$^2$) | 22 | 22 | 28 | 14 | 16 | 44 | 62 |
| Gel 0/10 (lb/100 ft$^2$) | 11/16 | 10/10 | 17/21 | 7/24 | 2/3 | 10/16 | 47/77 |
| ES (V) | 1345 | 1060 | 750 | 1060 | 55 | 255 | 397 |

TABLE 3-continued

|  | Emulsification agent | | | | | | |
|---|---|---|---|---|---|---|---|
|  | Before aging | | | | After aging 16 hours at 180° C. | | |
|  | TA1 | TA3 | TA4 | TA5 | TA1 | TA3 | TA4 |
| Filtrate at 30' (g) | 3.3 | 4.5 | 3.6 | — | 54.2 | 47.8 | 4.3 |
| Presence of water in filtrate | No | No | No | — | Yes | Yes | No |

AV: apparent viscosity
PV: plastic viscosity
YP: yield point (stress threshold)
Gel 0/10: values for gel at 10 s and 10 min
ES: electrical stability It can be seen that in the case of the comparative formulation (TA1), the electrical stability collapsed after the aging step at 180° C. and the filtration results were poor (presence of water in the filtrate). In the case of the systems of the invention, the drop in electrical stability was much less severe, and the filtration results were better; for the TA4 system, they were excellent.

The same determinations were carried out using complete muds with the same composition but in which the Ultidrill® mineral oil was replaced by EDC95® (H2) mineral oil.

In the muds considered in the second series, the emulsification systems used were TA1, TA4 and TA6.

The results are shown in the table below.

TABLE 4

|  | Before aging | | | After aging 16 hours at 180° C. | | |
|---|---|---|---|---|---|---|
| Emulsification agent | TA1 | TA4 | TA6 | TA1 | TA4 | TA6* |
| AV (cP) | 55 | 69 | 57 | 48 | 70 | 24 |
| PV (cP) | 42 | 50 | 48 | 43 | 50 | 16 |
| YP (lb/100 ft$^2$) | 26 | 38 | 18 | 10 | 40 | 16 |
| Gel 0/10 (lb/100 ft$^2$) | 14/20 | 18/26 | 22/16 | 3/4 | 27/45 | 22/22 |
| ES (V) | 1307 | 751 | — | 232 | 505 | — |
| Filtrate at 30' (g) | 2.0 | 2.1 | — | 13.6 | 2.2 | — |
| Presence of water in filtrate | No | No | — | Yes | No | — |

AV: apparent viscosity
PV: plastic viscosity
YP: yield point (stress threshold)
Gel 0/10: values for gel at 10 s and 10 min
ES: electrical stability
*16 hours at 150° C.

Using oil base H2, again it can be seen that the stability of the emulsion produced using the systems of the invention was very much higher than that produced using the comparative system (TA1).

EXAMPLE 4

DSC Study

We used a DSC calorimetric technique to demonstrate that the size of the droplets contained in the complete mud produced with superamides was less affected by aging at 180° C. It is very difficult to measure the size of the water droplets in an oil-base mud mainly because of the large quantity of solids contained in this type of fluid. DSC enables a complete mud sample to be analysed without dilution. This sample was cooled until crystallisation of the water droplets was observed. The lower the observed crystallisation temperature, the smaller the droplets (Clausse, D., "Research Techniques Utilizing Emulsions", *Encyclopedia of Emulsion Technology*, Becher, P., pub: Dekker, New York, 1985; Vol. 2, p. 77).

Two muds formed with base oil H2 were compared, one produced with the commercially available emulsification system TA1 and the other with the TA4 system of the invention. These two muds were studied using DSC before aging (FIGS. 1 and 2) and after aging for 16 hours at 180° C. (FIGS. 3 and 4). Comparing the two types before aging (BHR), it can be seen that their crystallisation temperatures were similar (about −93° C.). It can thus be assumed that after production at ambient temperature, the two muds have a water droplet population of comparable size and thus comparable stability. When analysing the muds after aging (AHR), it can be seen that this was no longer the case. For TA1 based muds, the crystallisation temperature was then of the order of −55° C. Thus, the droplets had coalesced. After 16 hours, therefore, the mud's stability was no longer very high. In contrast, for the TA4-based muds, the results after aging were much better. Two crystallisation peaks were observed. Thus, the droplets have different sizes. The first peak was at about −59° C. and the second peak was at about −77° C., indicating that the average size of the water droplets in the mud produced using TA4 is much smaller than the average size of droplets in the mud produced using TA1. The stability of the mud produced with the system of the invention was thus better after aging than that of the comparative system.

EXAMPLE 5

Toxicity and Biodegradability of the System of the Invention

This study was carried out by NIVA, an independent Norwegian laboratory specialising in evaluating the toxicity of oil-based fluids used in the North Sea.

These tests concerned biodegradability in seawater, and toxicity.

The seawater biodegradability test was carried out using SA3 superamide emulsification agent using the standard OECD 306 protocol (closed bottle test). A biodegradability of 65% (62.6-66.4%) was obtained, which was eminently acceptable.

The toxicity was monitored with a formulation containing 125 ml of Ultidrill® oil, 125 ml of brine containing 20% by weight of $CaCl_2$, 12.5 g of $Ca(OH)_2$, 6.5 g of emulsification agent constituted by 1.25 g of SA3 and 5 g of tall oil fatty acid (Résinoline BD2®), and 0.42 g of glycerol, on three species present in the North Sea.

A marine algae growth inhibition test was carried out on *Skeletonema costatum* in accordance with ISO standard 10253, and an acute lethal toxicity test was carried out using *Arcatia tonsa* and *Corophium Volutator* using the ISO/FDIS 14669 protocol.

The results are shown in the table below:

TABLE 5

| Species | | |
|---|---|---|
| *Skeletonema costatum* | *Arcatia tonsa* | *Corophium Volutator* |
| $ErC_{50}$ = 2900 mg/l ((*) | $LC_{50}$ > 10000 mg/l () | $LC_{50}$ > 2056 mg/l () |

The results given here demonstrate the good biodegradability and absence of toxicity of the products used.

The invention claimed is:

1. A method for well drilling, completion or workover operation, comprising circulating an oil-based well fluid that is temperature-stable and particularly suitable for high pressure/high temperature drilling, comprising an aqueous phase dispersed in a non-miscible continuous phase, and comprising a liquid emulsification system comprising:
   a) at least one superamide having at least 90% by weight of at least one compound of the following formulae:

$$[R^1—CON(R^2)—CH_2CHR^3—O]_pX \quad (I)$$

where
   $R^1$ represents a linear or branched, saturated or unsaturated $C_7$-$C_{30}$ hydrocarbon radical, optionally carrying at least one hydroxyl group;
   $R^2$ represents a hydrogen atom;
   $R^3$ represents a hydrogen atom or a $C_1$-$C_4$ hydrocarbon radical;
   X represents a hydrogen atom, a $C_1$-$C_6$ hydrocarbon radical, a phosphate, carboxylate, sulphate or sulphonate group;
   p is 1 or 2 depending on the nature of X;
   (b) and at least one co-surfactant selected from the group consisting of fatty acids, dicarboxylic acids and carboxylates, wherein co-surfactant b) represents from 40 to 90% by weight of the liquid emulsification system.

2. A method according to claim 1, wherein, in the formula for the superamide, R1 is a C10-C22 hydrocarbon radical.

3. A method according to claim 1, wherein the superamide is obtained by transamidification of an ester of a fatty acid and a mono-alcohol or of an oil of plant or animal origin, by means of an alkanolamine.

4. A method according to claim 1, in which the quantity of aqueous phase represents 5% to 40% by volume of the well fluid and the quantity of continuous phase represents 60% to 95% by volume of to the total volume of the aqueous phase and the continuous phase.

5. A method according to claim 1, in which the quantity of aqueous phase represents 10% to 30% by volume of the well fluid and the quantity of continuous phase represents 70% to 90% by volume of to the total volume of the aqueous phase and the continuous phase.

6. A method according to claim 1, wherein said aqueous phase is selected from the group consisting of fresh water, sea water and brine, and said continuous phase is constituted by a base oil selected from the group consisting of gas oils, crude oils, gasolines, kerosines, olefinic hydrocarbon cuts and n-alkane cuts.

7. A method according to claim 1, wherein the liquid emulsification system is at a concentration of 10% to 30% by weight of the aqueous phase.

8. A method according to claim 1, comprising 5% to 25% by weight of lime, 5% to 15% by weight of organophilic treated clay, up to 10% by weight of fluid loss control agent and at least one weighting material in a quantity sufficient to produce a density of about 2.4 at 4° C.

9. A method according to claim 1, said well fluid comprising at least one weighting material in a quantity sufficient to produce a density of about 2.4 at 4° C. is barium sulphate.

10. A method according to claim 1, said well fluid further comprising 5% to 40% by weight with respect to the liquid emulsification system of at least one product selected from the group consisting of glycols, polyglycols, glycerol and polyglycerols.

* * * * *